March 12, 1968  F. J. COLVILLE ETAL  3,372,876
JET NOZZLE
Filed Oct. 23, 1965 es Patent Office 3,372,876
Patented Mar. 12, 1968

3,372,876
JET NOZZLE
Francis Jeffrey Colville, Sutton-in-Ashfield, and Norman
Roberts, Hucknall, England, assignors to Rolls-Royce
Limited, Derby, England a British Company
Filed Oct. 23, 1965, Ser. No. 502,864
Claims priority, application Great Britain, Nov. 6, 1964,
45,424/64
6 Claims. (Cl. 239—265.35)

ABSTRACT OF THE DISCLOSURE

A jet nozzle assembly for aircraft gas turbine engines, the assembly including a cylindrical outer casing and a coaxially mounted hollow inner body which define an annular space therebetween, the outer casing being movable relative to the inner body selectively to form a convergent or a convergent-divergent nozzle, the inner body having movable parts to vary the shape of said space. The inner body has means for compensating for pressure differences across the movable parts to minimize the force required to move the movable parts, has a downstream end aperture, and its upstream end communicates with a source of cooling fluid to cool the interior of the inner body.

---

Figure 1:
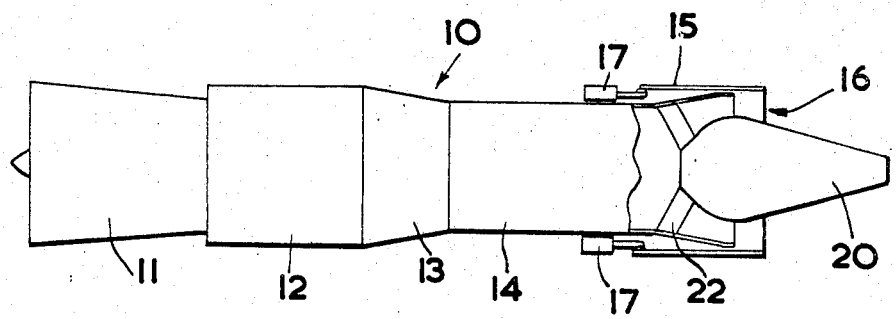

This invention concerns a jet nozzle e.g. for use on a gas turbine engine adapted to be employed for supersonic aircraft propulsion.

According to the present invention, there is provided a jet nozzle assembly for discharging jet gases, said nozzle assembly comprising a substantially cylindrical outer casing; an inner body mounted coaxially within the said outer casing and spaced therefrom to define an annular space through which jet gases may flow, said inner body being hollow and having at least one movable part forming a portion of the exterior of the same, said inner body having an aperture at its downstream end, its upstream end being in communication with a source of cooling fluid for cooling the interior of the inner body; actuating means for moving said at least one movable part relative to the remaining portion of said inner body so as to vary the shape of said annular space; and pressure compensating means operatively coacting with said at least one movable part to compensate for pressure differences thereacross caused by jet gases and thereby reducing the force required to move said at least one movable part by said actuating means.

Preferably the inner body is of bulbous shape, and means are provided for effecting relative movement between the outer casing and the inner body so that the nozzle may be formed, as required, into either a convergent or a convergent-divergent nozzle.

Thus means may be provided for establishing communication between the said annular space and the interior of the inner body (or the portion thereof adjacent the said movable part or parts).

Alternatively, or additionally, means may be provided for supplying the interior of the inner body (or the portion thereof adjacent the said movable part or parts) with air or gas under pressure, a valve controlling flow of the said air or gas either inwardly to, or outwardly from, the said interior (or portion thereof), and means which are affected by the said pressure difference and which control the opening and closing of the said valve.

The means for moving the movable part or parts may thus comprise power means which are connected to the movable part or parts by a mechanical linkage, the mechanical linkage having a component which is resiliently urged towards a predetermined position but which will be moved away from said predetermined position when substantial force has to be exerted on the said mechanical linkage in order to overcome the force exerted on the said movable part or parts by the said pressure difference, opening and closing of the said valve being controlled in dependence upon the position of the said component.

The inner body may have two axially consecutive sets of the said movable parts which may be moved towards and away from the central axis of the body so as to vary the cross sectional area of the throat of the nozzle.

The invention also comprises a gas turbine engine provided with a jet nozzle as set forth above.

Figure 2:
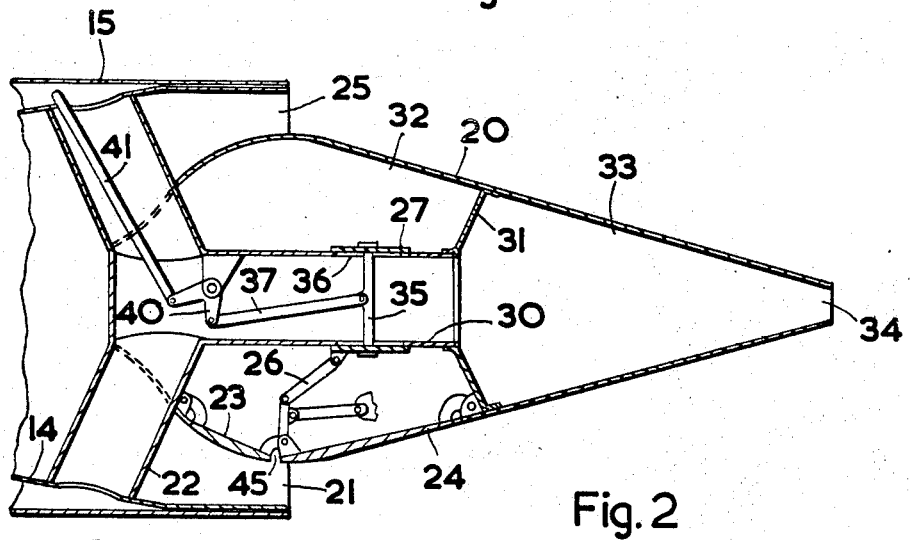
Figure 3:
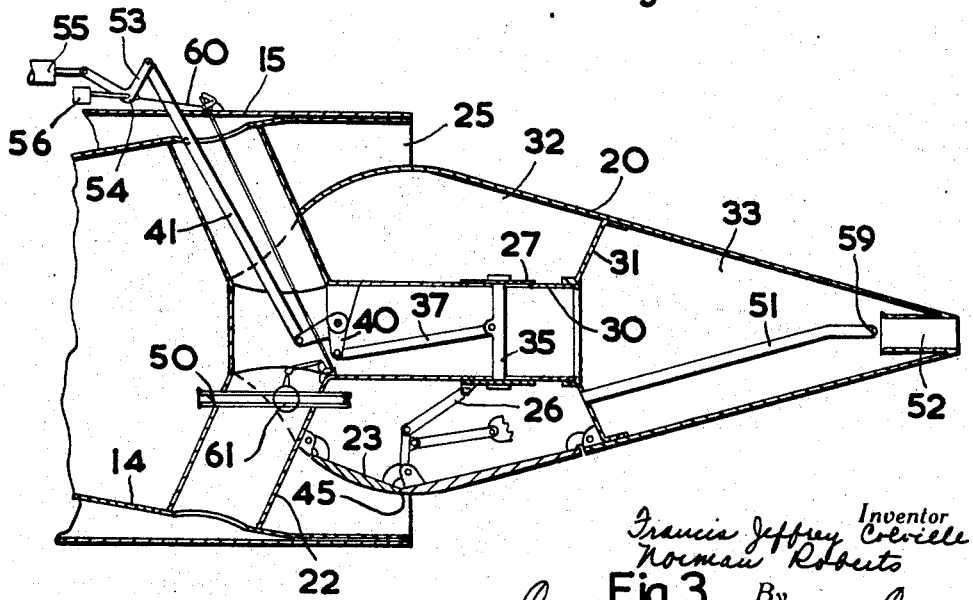

The invention is illustrated, merely by way of example, in the accompanying drawings in which:

FIGURE 1 is a diagrammatic view partly in section of a gas turbine engine provided with a jet nozzle according to the present invention, FIGURE 2 is a broken-away sectional view on a larger scale of the jet nozzle shown in FIGURE 1, and FIGURE 3 is a broken away sectional view which is similar to FIGURE 2, but which illustrates an alternative embodiment.

In FIGURE 1, there is shown a supersonic gas turbine engine 10 having a compressor 11, combustion equipment 12, a turbine 13 and a jet pipe 14 all arranged in flow series.

Mounted about the downstream end of the jet pipe 14 is a cylindrical outer casing 15 which forms part of a jet nozzle 16. The outer casing 15 is slidable over the jet pipe 14 by means of rams 17.

The jet nozzle 16 has a bulbous inner body 20 whose upstream end is mounted within the downstream end of the jet pipe 14, and thus within the outer casing 15, and which is spaced therefrom by an annular space 21 through which may pass the jet gases of the engine. The inner body 20 is supported within the jet pipe 14 by a plurality of angularly spaced apart hollow struts 22.

The outer casing 15 may be moved in a downstream direction from the position shown in FIGURE 2, in which the nozzle has a convergent form, towards the position shown in FIGURE 1 in which the nozzle has a convergent-divergent form.

The inner body 20 has two axially consecutive sets of pivotally movable parts 23, 24 which may be moved towards and away from the central axis of the central body so as to vary the cross-sectional area of the throat 25 of the nozzle.

Each pair of movable parts 23, 24 is connected by a linkage 26 to a sleeve 27. The sleeve 27 is slidably mounted on a tube 30 which is mounted within the inner body 20. The upstream end of the tube 30 is supported by the struts 22 while the downstream end of the tube 30 supports a wall 31 which divides the interior of the inner body 20 into compartments 32, 33.

Ambient air may flow through the interiors of the hollow struts 22 and thence through the interiors of the tube 30 and of the compartment 33 to a nozzle 34 at the downstream end of the compartment 33. Such a flow of air serves to cool the struts 22, the tube 30 and the downstream compartment 33 of the inner body 20.

A bar 35 extends diametrically across the interior of the sleeve 27 and is slidably mounted in slots 36 in the tube 30. The sleeve 27 is of such a length that it covers and seals slots 36 in any actuated position and thereby isolates the interior of tube 30 from compartment 32. The bar 35 is pivotally connected to one end of a link 37 whose other end is pivotally connected to one arm of a bell crank lever 40. The other arm of the bell crank lever 40 is pivotally connected to a link 41 which may be moved by a ram (not shown) so as to effect sliding movement of the sleeve 27 over the tube 30 and hence through linkage 26, movement of the movable parts 23, 24 toward or away from the central axis of inner body 20 so as to vary the cross-sectional area of the throat 25 of the nozzle.

It is desirable to ensure that any unbalanced loads due to pressure differences across the movable parts 23, 24 are as small as possible so as to minimise the force required to move them into the path of the jet gases. One way in which this may be done is illustrated in FIGURE 2 in which the movable parts 23, 24, instead of being sealed to each other, as would be normal practice, have a gap 45 between them (formed, for example, by omitting seals therebetween) for establishing communication between the annular space 21 and the interior of the compartment 32. This reduces the pressure differential between the annular space 21 and the compartment 32.

The same effect could, of course, be achieved by drilling holes (not shown) in the parts 23, 24 or in parts of the inner body 20 adjacent thereto.

In certain applications, the omission of seals between parts 23 and 24, or the drilling of holes in the parts 23, 24 may not provide the required load balancing thereof. This would be the case, for example, where the surface area of part 23 is large and is exposed to the high pressure of the jet gases in annular space 21 and the area of part 24 is small and is exposed to the lower pressure prevailing downstream of throat 25. If the position of gap 45 is thus sufficiently far downstream of throat 25, the relatively low pressure which will obtain within compartment 32 would not balance the forces acting on part 23, even if the resultant forces acting on part 24 were acting in the opposite direction to those on part 23. Thus a large force would be necessary to move the parts 23, 24 outwardly from the central axis of inner body 20 in this case, although this force would naturally be smaller than if the parts 23, 24 were sealed to each other and there were no holes drilled therethrough. It would be possible to select the position of any holes drilled through the parts 23, 24 relative to throat 25 to provide the minimal net loading on parts 23, 24, but this may not always be desirable from the point of view of, for example, mechanical weakness or where the use of afterburners upstream of inner body 20 would lead to the entry of hot gas into the inner body 20.

The construction shown in FIGURE 3 is generally similar to that of FIGURE 2, and will not therefore be described in detail, like reference numerals being used to indicate like parts. Parts 23, 24 are however now sealed to each other to form a closed compartment 32.

In the FIGURE 3 construction, a pipe 50 is provided to supply the compartment 32 with gas under pressure. The said gas may, as shown, be exhaust gas derived from the jet pipe 14 upstream of any reheat fuel burners or afterburners or may be compressed air from the compressor 11.

A pipe 51 which is mounted within the compartment 33 communicates at the upstream end with the compartment 32. The exhaust gas (or compressed air from the compressor 11) which flows through the pipe 51 leaves a jet nozzle 59 at the downstream end of the latter to flow through a tube 52 at the downstream end of the inner body 20. Any flow of compressed air or gas under pressure passing through the nozzle 59 at the downstream end of pipe 51, thus induces an increased flow of cooling air through the struts 22, tube 30, compartment 33 and tube 52.

The non-reheated exhaust gas or compressed air which flow through compartment 32 will also give a cooling effect to any flaps or structure relative to a possible reheated gas temperature following an afterburner (not shown) in pipe 14.

The link 41 is pivotally connected to an arm of a bell crank lever 53 having a movable fulcrum 54. The other arm of the bell crank lever 53 is pivotally connected to a ram 55.

The fulcrum 54 is urged towards a predetermined position by a spring 56. When, however, the ram 55 has to exert substantial force on the linkage constituted by the parts 53, 41, 40, 37, in order to overcome the force exerted on the movable parts 23, 24 by the pressure difference across them, the link 41 will tend to remain stationary and the fulcrum 54 will therefore be moved by the ram 55 against the action of the spring 56.

The fulcrum 54 is connected by a rod system 60 to a valve 61 which controls fluid flow through the pipe 50. The arrangement is such that the valve 61 is closed and opened in dependence upon the position of the fulcrum 54 so as to maintain the pressure within the compartment 32 at a value which gives a load balance across the flaps 23, 24.

The connection between fulcrum 54 and valve 61 may be effected alternatively by cables if a return spring is incorporated in valve 61 or some other convenient point.

Although the valve 61 is depicted in FIGURE 3 as being operative on the flow through pipe 50, it is to be understood that it could equally well be disposed on pipe 51 were the temperature conditions and service accessibility thereto suitable.

We claim:

1. A jet nozzle assembly for discharging jet gases, said nozzle assembly comprising a substantially cylindrical outer casing; an inner body mounted coaxially within the said outer casing and spaced therefrom to define an annular space through which jet gases may flow, said inner body being hollow and having at least one movable part forming a portion of the exterior of the same, said inner body having an aperture at its downstream end; a source of cooling fluid; means connecting the upstream end of said inner body with said source of cooling fluid for cooling the interior of said inner body; actuating means for moving said at least one movable part relative to the remaining portion of said inner body so as to vary the shape of said annular space; and pressure compensating means operatively coacting with said at least one movable part to compensate for pressure differences thereacross caused by jet gases and thereby reducing the force required to move said at least one movable part by said actuating means.

2. A jet nozzle as claimed in claim 1 in which said inner body is of bulbous shape, and means to effect relative movement between said outer casing and the inner body to form the nozzle assembly selectively into a convergent and a convergent-divergent nozzle assembly.

3. A jet nozzle as claimed in claim 1 in which said compensating means includes means for establishing communication between the said annular space and at least part of the interior of the inner body.

4. A jet nozzle as claimed in claim 1 in which said compensating means includes supply means for supplying at least part of the interior of the inner body with fluid under pressure, a valve controlling flow of the said fluid relative to said interior of the inner body, and pressure-sensitive means responsive to the said pressure difference and control the opening and closing of the said valve.

5. A jet nozzle as claimed in claim 1 which said actuating means includes power means for moving the said at least one movable part and a mechanical linkage connecting said power means to said at least one movable part, and in which said compensating means further includes a component in said mechanical linkage which is resiliently urged towards a predetermined position but which is moved away from said predetermined position when substantial force is exerted on the said mechanical linkage to overcome the force exerted on the said at least one movable part by the said pressure difference, opening and closing of the said valve being controlled in dependence upon the position of the said component.

6. A jet nozzle as claimed in claim 1 in which said inner body has two axially consecutive sets of the said movable parts movable towards and away from the control axis of the body to vary the cross-sectional area of said annular space of the nozzle.

References Cited

UNITED STATES PATENTS

| | | | |
|---|---|---|---|
| 2,570,629 | 10/1951 | Anxionnaz et al. | 239—265.33 |
| 2,938,335 | 5/1960 | Cook | 239—265.13 |
| 2,952,124 | 9/1960 | Pearson | 239—265.13 |
| 3,044,258 | 7/1962 | Carlton et al. | 239—265.39 |
| 3,046,730 | 7/1962 | Petran | 239—265.39 |
| 3,237,864 | 3/1966 | Taylor et al. | 239—265.41 |

FOREIGN PATENTS 950,288  2/1964  Great Britain.

EVERETT W. KIRBY, *Primary Examiner.*